M. BAKER.
CHAIN ATTACHING DEVICE.
APPLICATION FILED DEC. 13, 1920.
1,385,032.
Patented July 19, 1921.
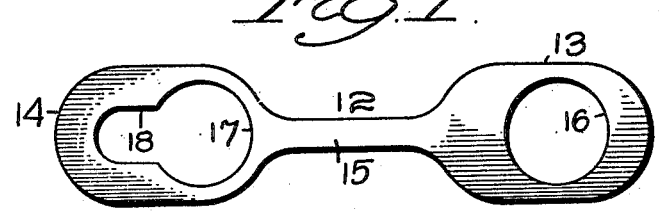
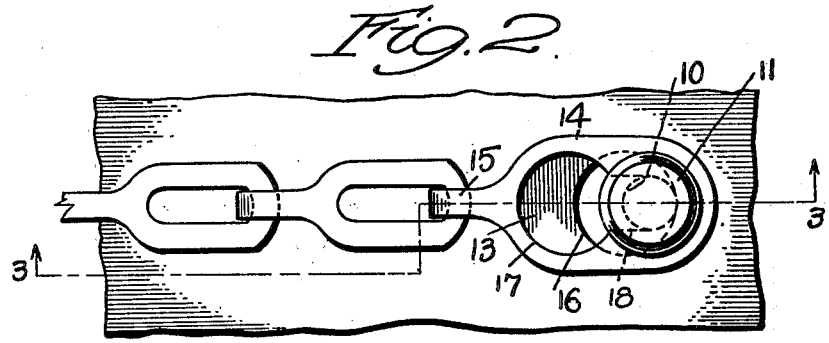
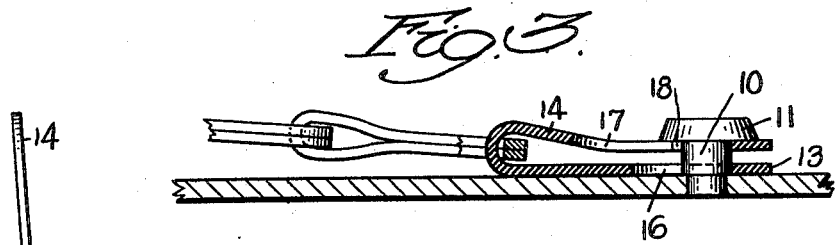
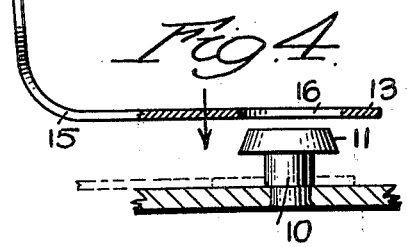
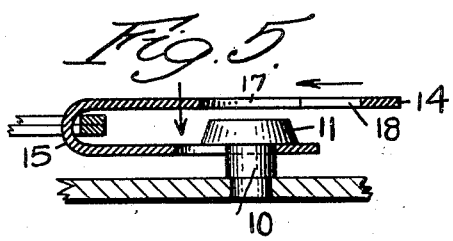
Inventor
Mack Baker
By Attorneys
Southgate & Southgate
Witness
C. F. Wesson

UNITED STATES PATENT OFFICE.

MARK BAKER, OF WORCESTER, MASSACHUSETTS, ASSIGNOR TO WORCESTER PRESSED ALUMINUM COMPANY, OF WORCESTER, MASSACHUSETTS, A CORPORATION OF MASSACHUSETTS.

CHAIN-ATTACHING DEVICE.

1,385,032.  Specification of Letters Patent.  Patented July 19, 1921.

Application filed December 13, 1920. Serial No. 430,367.

*To all whom it may concern:*

Be it known that I, MARK BAKER, a citizen of the United States, residing at Worcester, in the county of Worcester and State of Massachusetts, have invented a new and useful Chain-Attaching Device, of which the following is a specification.

This invention relates to a device for attaching a chain to any desired article such as a metal hot water bottle. Such articles are commonly buffed or polished after all other mechanical operations have been performed thereon. It has been found dangerous, however, to thus polish a hot water bottle or other similar article to which a length of chain has been attached as the chain easily becomes entangled with the cloth buffing wheel and frequent injury to the employee results therefrom.

It is the object of my invention to provide an attaching device by means of which a chain may be easily connected to such an article after all other mechanical operations have been performed and by which the chain will be thereafter securely held in place.

In the fulfilment of this object I provide a link of relatively soft metal or other non-resilient or ductile material which may be readily put in place and which is not easily detached when once so placed.

A preferred form of my invention is shown in the drawings in which

Figure 1 is a plan view of the link forming one part of my attaching device;

Fig. 2 is a plan view showing the device in use;

Fig. 3 is a sectional elevation taken along the line 3—3 in Fig. 2, and

Figs. 4 and 5 are sectional elevations showing different steps in applying the device.

Referring to the drawings, my improved chain attaching device may be described as comprising two elements, one of which is a stud 10 having an enlarged head 11 and adapted to be permanently riveted or otherwise secured to the outside of a hot water bottle or other article.

The other element comprises a link 12 formed with enlarged ends 13 and 14 and a much reduced intermediate portion 15. The link 12 is preferably formed of relatively soft metal or other suitable non-resilient or ductile material which may be readily bent to a desired shape and which will thereafter remain in such shape. The ends 13 and 14 of the link 12 are provided with circular openings 16 and 17 slightly greater in diameter than the head 11 of the stud 10. The opening 17 is also provided with a relatively narrow extension 18 of such width as to receive the stem of the stud 10.

In attaching a chain to a desired article, the opening 16 in the end 13 of the link is first pushed downward over the head of the stud 10 and is then drawn to the left to the position shown in dotted lines in Fig. 4. The end 14 of the link, after being passed through the end of the chain to be attached, is bent to the position shown in Fig. 5 and is then pushed downward over the head of the stud 10. The soft ductile nature of the material permits the link to be then drawn to the left to the position shown in Fig. 3, with the stem of the stud 10 received in the narrow portion 18 of the opening 17. The material being non-resilient will remain permanently in this position unless positively removed therefrom and the chain is thus securely attached to the article.

I have thus provided a very neat and simple attaching device which is easily applied and which forms a permanent and secure fastening.

Having thus described my invention, it will be evident that changes and modifications can be made therein by those skilled in the art within the spirit and scope of my invention as set forth in the claims, and I do not wish to be otherwise limited to the details herein disclosed, but what I claim is:—

1. A chain attaching device comprising a headed stud and a link formed of non-resilient material, said link having openings at each end through which the head of said stud may be passed and one of said openings having a narrow extension toward the adjacent end of said link adapted to receive the stem of said stud.

2. A chain attaching device comprising a headed stud and a link formed of relatively soft metal, said link having round openings in each end of slightly greater diameter than the head of said stud and one of said openings having a narrow extension toward the adjacent end of the link of slightly greater width than the stem of said stud.

3. A chain attaching device comprising a headed stud and a link formed of non-resilient material, said link having openings at each end through which the head of said stud may be passed and one of said openings having a narrow extension toward the adjacent end of said link adapted to receive the stem of said stud, the intermediate portion of said link being relatively narrow and easily bent after the parts are assembled.

In testimony whereof I have hereunto affixed my signature.

MARK BAKER.